Feb. 5, 1952   S. G. BLUMENSAADT   2,584,836
TRANSFER DEVICE

Original Filed Sept. 2, 1947   6 Sheets-Sheet 1

INVENTOR.
SVEND G. BLUMENSAADT
BY
*Gustav A. Wolff*
ATT.

Feb. 5, 1952  S. G. BLUMENSAADT  2,584,836
TRANSFER DEVICE

Original Filed Sept. 2, 1947  6 Sheets-Sheet 3

INVENTOR.
SVEND G. BLUMENSAADT
BY
Gustav A. Wolff
ATT.

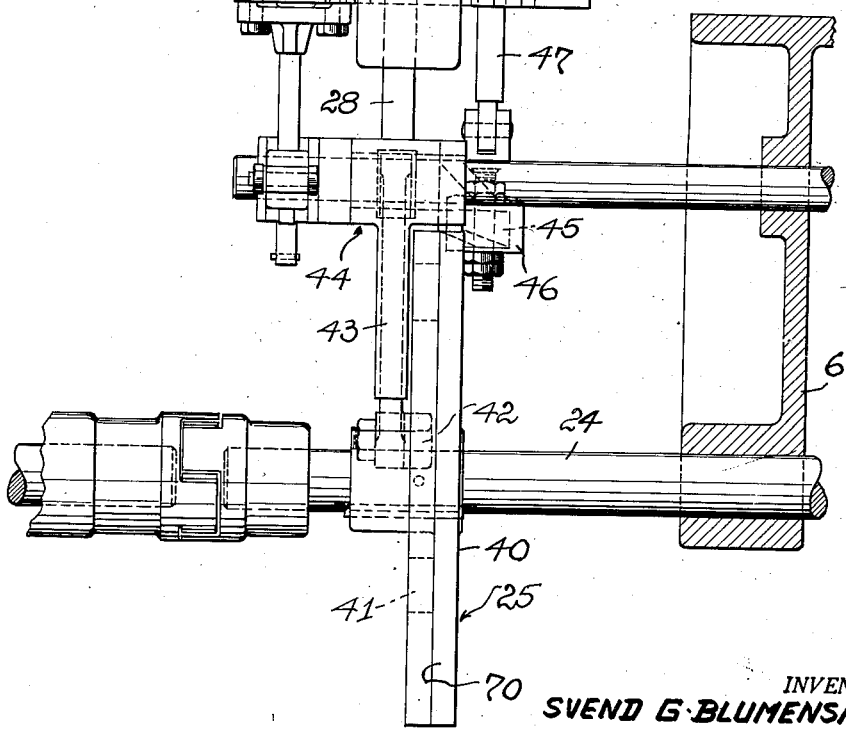

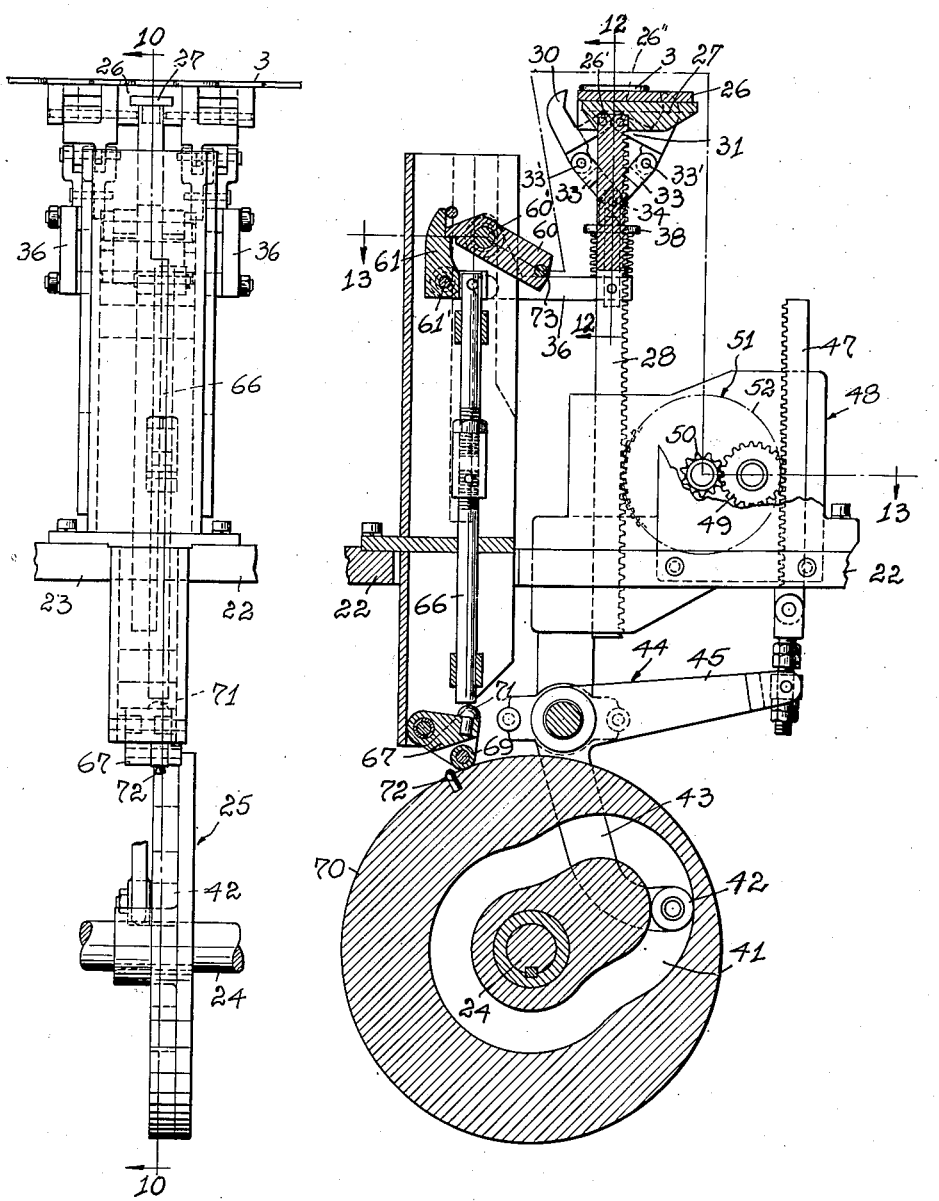

Feb. 5, 1952 — S. G. BLUMENSAADT — 2,584,836
TRANSFER DEVICE

Original Filed Sept. 2, 1947 — 6 Sheets—Sheet 6

INVENTOR.
SVEND G. BLUMENSAADT
BY
*Gustav A. Wolff.*
ATT.

Patented Feb. 5, 1952

2,584,836

UNITED STATES PATENT OFFICE 2,584,836

TRANSFER DEVICE

Svend G. Blumensaadt, Beachwood Village, Ohio, assignor to The Universal Wire Spring Company, Cleveland, Ohio, a corporation of Ohio Original application September 2, 1947, Serial No. 771,592. Divided and this application January 23, 1948, Serial No. 3,938

11 Claims. (Cl. 214—1)

This application is a division of my copending application Serial No. 771,592 filed on September 2, 1947.

This invention refers to transfer devices of the type carrying objects in a cycle from one location to another one and back to the original location and has for its general object the provision of a specific transfer device constructed to grip and transfer wire members from a definite location to wire forming means, hold such wire members while actuated upon by the wire forming means and finally transfer the formed wire members back to the original location.

Another object of the invention is the provision of a specific transfer device in which vertically shiftably arranged supporting means for wire members shiftably mount gripping means for wire members, and in which the gripping means are actuated upon by spring controlled means associated with the wire member supporting means to effect snap-like gripping action of the wire gripping means when the wire member supporting means are in predetermined position.

A further object of the invention is the provision of a specific transfer device in which vertically shiftably mounted supporting means for wire members, adapted to travel through a cycle, pivotally support lever-like gripping means for wire members, in which the wire gripping means are actuated upon by spring controlled means adapted to effect snap-like closing of the gripping means, in which pivotally supported stop means cooperate with the spring controlled means in effecting opening up of the gripping means when the supporting means travels through predetermined portions of its cycle, and in which rotary cam means vertically shift the supporting means and control timed opening and snap-like gripping action of the gripping means in predetermined portions of the cycle of said supporting means.

Additional objects and novel features of construction, combinations and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

In the drawings:

Fig. 7 is a sectional view through Fig. 8, the section being taken on line 7—7 of said figure; and Fig. 8 is a sectional view of the transfer device the section being taken on line 8—8 of Fig. 3 and showing the mounting of the device on a frame structure and actuation by cam shaft means.

Fig. 9 is a fragmentary view of the device, the view being taken from the left side of Fig. 3;

Fig. 10 is a sectional view taken on line 10—10 of Fig. 9;

Figure 1:
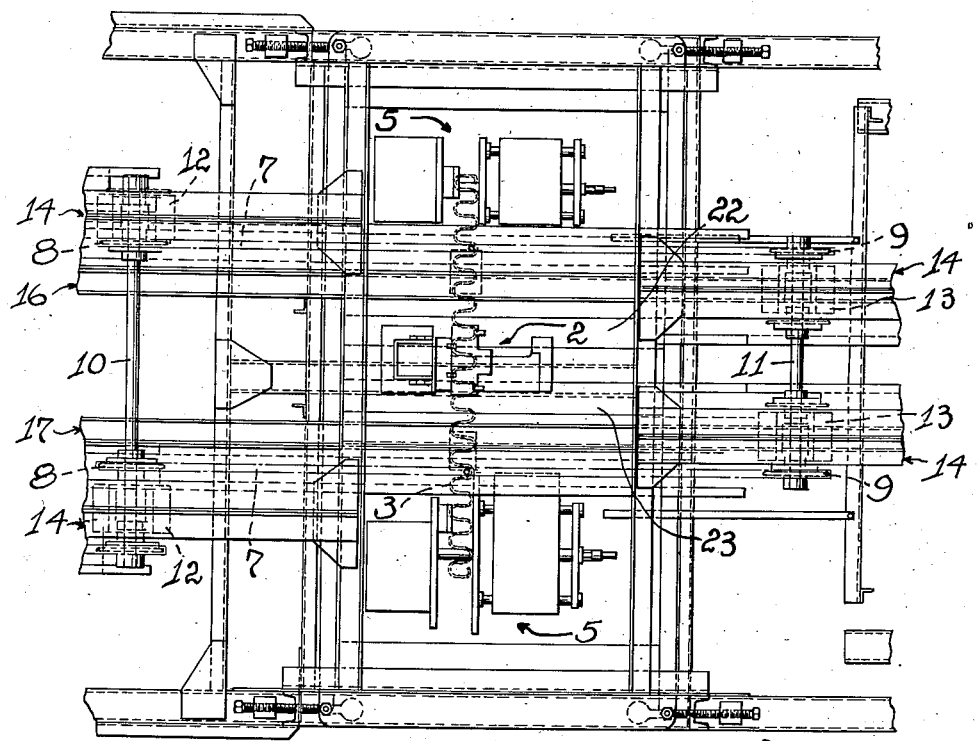
Fig. 1 is a fragmentary plan view of a wire forming machine with a transfer device constructed in accordance with the invention, the device effecting transfer of wire members from conveying means downwardly to wire strip twisting units and after twisting operations upwardly back to the conveying means.
Figure 2:
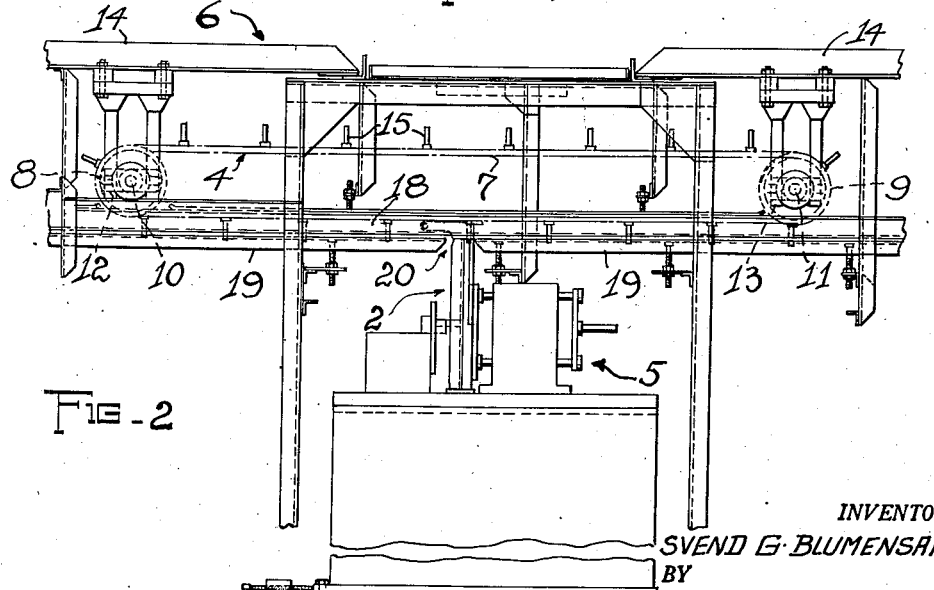
Fig. 2 is a side view of the wire forming machine shown in Fig. 1.
Figure 3:
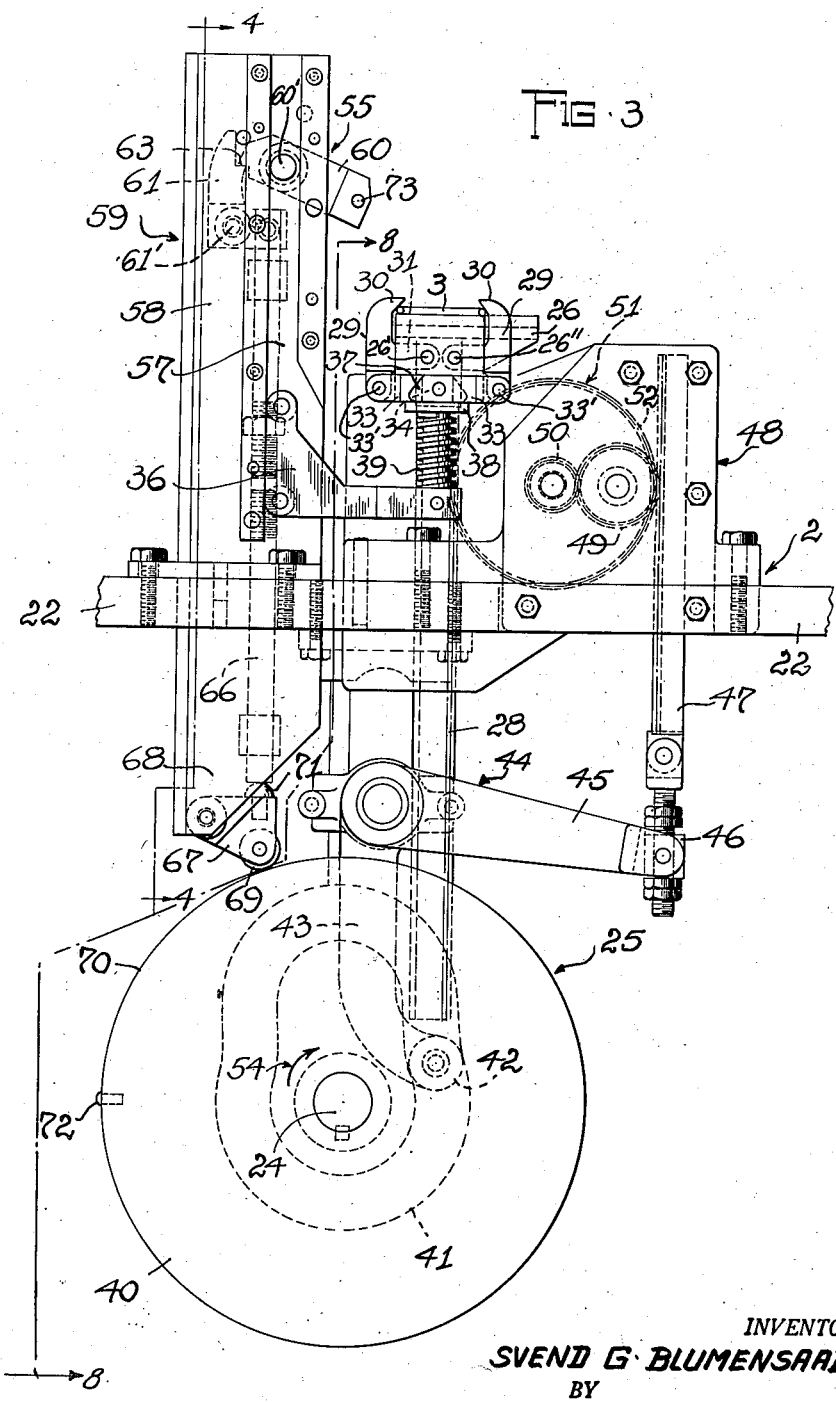
Fig. 3 is an enlarged side view of the transfer device.
Figure 4:
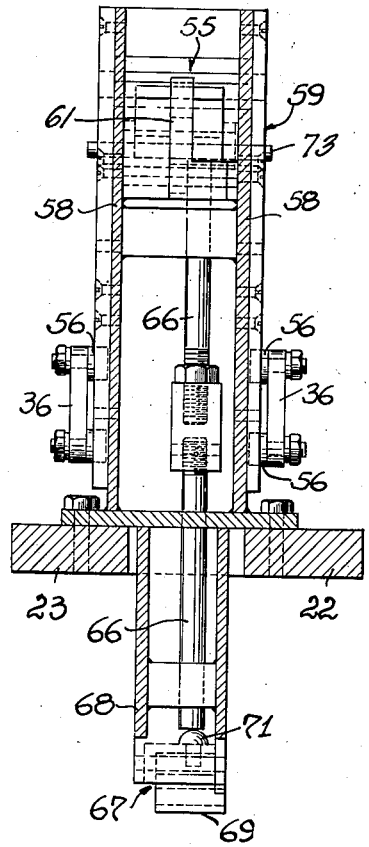
Fig. 4 is a transverse, sectional view through Fig. 3, the section being taken on line 4—4 of said figure.

Referring now more in detail to the drawings, Figs. 1 and 2, transfer device 2 shown therein effects transfer of sinuously corrugated wire strips 3 from conveying means 4 to wire forming mechanism 5 and after forming operations back to the conveying means. The conveying means is mounted on an elongated frame structure 6 and embodies a pair of drive chains 7, carried by pairs of chain wheels 8 and 9 on shafts 10 and 11 which are fulcrumed in bearings 12 and 13, adjustably secured to spaced longitudinal top members 14 of frame structure 6. Drive chains 7 advance the wire strips 3 by means of drive studs 15, attached at spaced intervals to said chains, between track means 16 and 17 vertically adjustably supported by the frame structure 6 lengthwise thereof.

These track means are constructed from oppositely arranged channel irons 18 and 19 slightly vertically spaced from each other in inverted position with respect to each other to permit guiding of the wire strips between the opposed web portions of the channel irons. The track means 16 and 17 have their lower channels 19 interrupted at 20 to permit transfer of wire strips 3 from said track means to wire forming units and back to the track means after forming operations as will be described later.

The sinuously corrugated wire strips 3, when fed into the track means, are engaged by the drive studs 15 and advanced in said track means for successive alignment with the interruption 20 in lower channels 19 and transfer to wire forming units by the transfer device 2. This transfer device is mounted on bars 22, 23 of the frame structure 6 in such a manner that a shaft 24 actuating the wire forming units aligns with and extends through the main cam arrangement 25 of the transfer device 2 and forms the main cam shaft for the transfer device.

The transfer device 2 embodies a sliding table 26 horizontally slidably supported by a slide 27 which is rigidly secured to a vertically shiftable rack bar 28. The sliding table 26 pivotally supports on pins 26' and 26" and in symmetrical arrangement with respect to rack bar 28 pairs of jaw members 29, each of which includes a gripping finger portion 30, a lateral extension 31 pivoted to sliding table 26, and a lower end portion 32. Each of the pairs of jaw members 29 has the lower end portions of their clamping members pivotally connected by pins 33' to pairs of lever members 33 which are pivotally secured to the enlarged head 34 of a vertical rod 35 secured at its other end to a trip arm bracket 36. There are two vertical rods and two trip arm brackets, one for each pair of jaw members, which trip arm brackets are located at opposite sides of rack bar 28. The lever members 33 are formed at their lower ends with cam-shaped extensions 37 which effect shifting of a spring controlled collar member 38 slidably mounted on vertical rod 35. The collar member 38 is yieldingly shifted toward cam-shaped extensions 37 by a compression spring 39 to effect outward shifting of the lever members 33 and inward shifting of the jaw members 29, as will readily be seen from inspection of Figs. 3 through 8 and 12.

Figure 5:
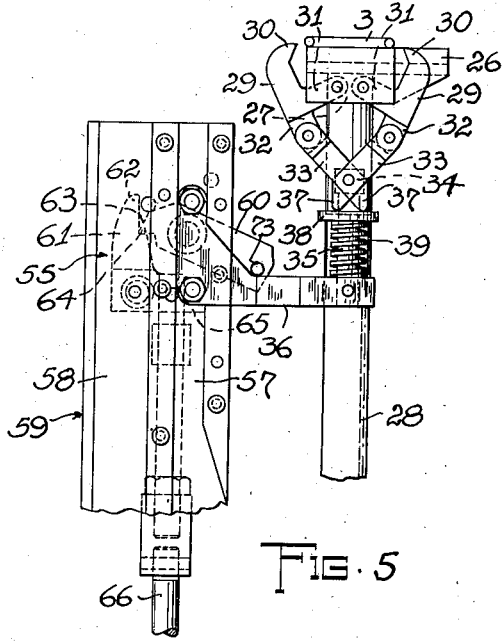
Fig. 5 is a fragmentary side view of the transfer device in position to grip by its tongues a corrugated wire strip for transfer of such strip to wire strip twisting units.
Figure 6:
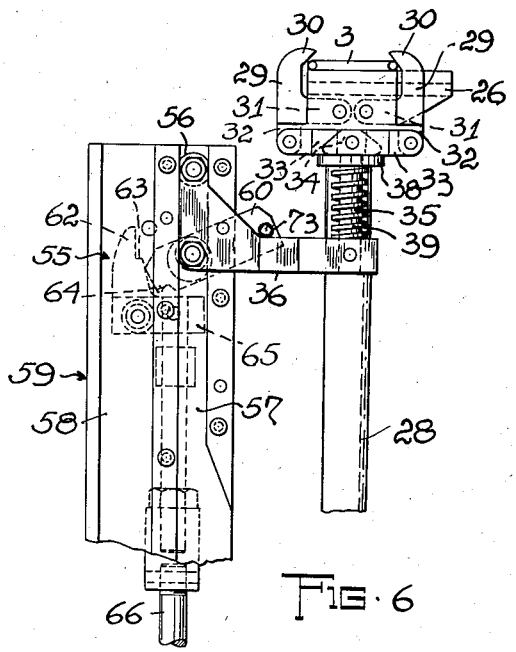
Fig. 6 is a view similar to Fig. 5 showing the transfer device gripping a corrugated wire strip.
Figure 11:
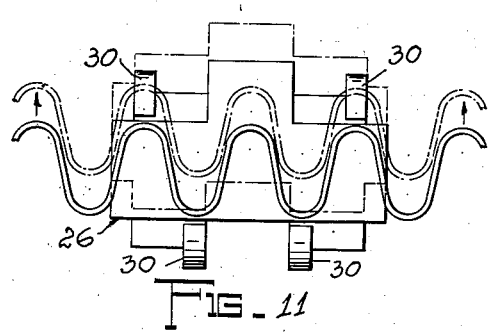
Fig. 11 is a plan view of the table showing in dash-dotted line such table shifted on its slide.
Figure 12:
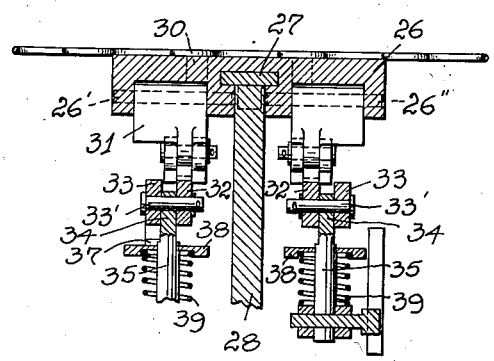
Fig. 12 is a fragmentary sectional view taken on line 12—12 of Fig. 10.
Figure 13:
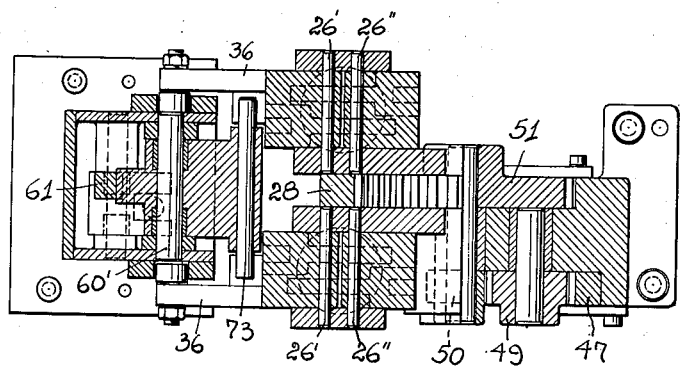
Fig. 13 is a sectional view on line 13—13 of Fig. 10.

Jaw members 29, as previously stated, are automatically shifted into gripping position by springs 35 which through collar member 38 tilt levers 33 on their pins 33' and effect shifting of the jaw members on their pins 26' into gripping position (see Fig. 6). A release of the gripping action of jaw members 29 is effected when during upward movement of table 26 the upward movement of trip arm brackets 36—coupled with the jaw members by vertical rods 35 and levers 33—is arrested in a manner later to be described. Such arresting of the upward movement of brackets 36 increases the actual distance between the pivots of jaw members 29—pivoted to table 26—and the connection of levers 33 with vertical rod 36—pivoted to said levers by pin 33'—and this change in the distance of the two pivots above mentioned effects tilting of the jaw members on their pins 26' and tilting of the levers on their pin 33', and therewith compression of spring 39 by the cam-shaped end portions 37 of levers 33 (see Fig. 5 showing the jaw members in released position). A release of trip arm brackets 36 by trip action, as will be later described, automatically effects returning of jaw members 29 to gripping position, as in this case compressed spring 39 is free to effect tilting of both levers 33 and jaw members 29 in opposite directions.

Sliding table 26 is vertically shifted by rotation of cam shaft 24 which actuates the main cam arrangement 25. This cam arrangement embodies a cam 40 secured to shaft 24, which cam guides in its cam slot 41 a cam roller 42, attached to the end of lever arm 43 on a bell crank 44. The second lever arm 45 of the bell crank 44 is coupled with a swivel block 46 pivoted to a vertically shiftable rack bar 47 which is slidably mounted in a housing 48. This housing has journaled therein a spur gear 49 meshing the rack bar 47 and the small gear 50 of a double gear 51 also journaled in housing 48. The double gear 51 engages with its larger gear 52 the vertically shiftable rack bar 28 mounting table slide 27.

Rotation of cam shaft 24 in the direction indicated by arrow 54 effects oscillation of bell crank 44 and therewith up and downward shifting of rack bar 47, rack bar 28 and table slide 27 supported thereby. During such shifting of the table slide jaw members 29 are actuated to grip and release a wire strip and permit such strip to be readily taken from the track means, carried to the wire forming units, subjected to forming operations and, finally, carried back to the track means. Such a gripping and releasing action of the pairs of jaw members 29 is effected by a trip mechanism 55 cooperating with the two trip arm brackets 36, which are guided by rollers 56 extended into cam slots 57 on the wall 58 of a trip lever housing 59. The trip mechanism 55 embodies a main trip lever 60 pivotally supported on a pin 60' in trip lever housing 59, which main trip lever cooperates with a shiftable, bell-crank-shaped trip finger member 61 pivotally supported on a pin 61' in housing 59. Trip finger member 61 has one lever arm 62 formed with a shoulder portion 63 for cooperation with the tooth-like end portion 64 of the main trip lever 60 to effect arresting of counter-clockwise rotation of such main trip lever when in a predetermined position. The second lever arm 65 of trip finger member 61 is connected to a rod 66 vertically shiftably supported in housing 59. This rod cooperates with a second trip lever 67 which is pivotally mounted in the lower portion 68 of housing 59 and includes a roller 69 engaging the peripheral cam surface 70 of the cam 40 and a headed pin 71 contacting the bottom face of rod 66. The second trip lever 67 effects upward shifting of rod 66 when such lever is actuated by engagement of its roller 69 with a pin 72 extended from the cam surface 70 of cam 40. Upward shifting of rod 66 causes rotation of trip finger member 61, and effects release of main trip lever 60 which, when prevented from rotation by trip finger member 61, stops by a cross pin 73 further upward shifting of the trip arm brackets 36. Such action induces opening up of the jaw members and permits release of the wire strip 3 held thereby. Tripping of trip finger member 61 in the manner described above releases the trip arm brackets 36 so that compression spring 39 can actuate to yieldingly snap the jaw members 29 inwardly and grip a wire strip resting on the top of the table 26.

A transfer device of the type described above is timed to stop and start when its table 26 is in approximately horizontal alignment with the track means 16 and 17. At this time, the pairs of jaw members 29 are in their opened up positions and compression spring 39 is under compression (see Fig. 5). Actuation of the trip mechanism 55, as described above, effects quick gripping of the wire strip resting on the table by the pairs of jaw members 29 which then securely hold the wire strip when the table is carried down to the wire forming devices and, after a time interval, is carried up back to the track means 16 and 17 for further advancing and final discharge.

The wire forming units may be of any desired construction and give the wire strips any desired shape and form. Such forming units have no specific relation to this invention and are not described in detail as this invention concerns merely the design of a transfer device adapted to grip and carry a wire member from one location to another one to be actuated upon and thereafter carry such wire member back to its first location.

Having thus described my invention, what I claim is:

1. A corrugated wire strip transfer device embodying a table adapted to support a portion of a corrugated wire strip, a vertically shiftable support for said table, wire strip gripping means pivoted to said table for cooperation therewith in wire strip gripping action, lever and spring means for automatically shifting said wire strip gripping means to gripping position, shiftable supporting means pivotally coupled with said lever means and mounting said spring means, releasable stop means for said shiftable supporting means adapted to arrest said supporting means in predetermined position to effect release of the gripping action of said wire strip gripping means when said shiftable table support is traveling upward, and a tripping device for releasing said stop means and effect snap-like gripping action of said wire gripping means by said lever and spring means.

2. A corrugated wire strip transfer device embodying a frame, a table, a vertically shiftable support for said table including a rack bar, gearing mounted on said frame and engaged with said rack bar, gripping jaw members pivoted to said support and cooperating therewith in gripping a corrugated wire strip resting on said table, spring controlled scissor-like lever means coupled with said jaw members, bracket means pivotally mounting said scissor-like lever means, spring means seated in said bracket means and yieldingly engaged with the lever means, and tripping mechanism mounted on said frame and cooperating with said bracket means in effecting gripping and releasing action of said jaw members in predetermined positions of said shiftable support.

3. A corrugated wire strip transfer device embodying a frame, a table, a vertically shiftable support for said table including a rack bar, gearing mounted on said frame and engaged with said rack bar, pairs of gripping jaw members pivoted to said support and cooperating therewith in gripping a corrugated wire strip resting on said table, a pair of scissor-like lever means coupled with said jaw members, a pair of shiftable trip arm brackets arranged symmetrically with respect to said rack bar and pivotally mounting said scissor-like lever means, spring means seated on each of said shiftable trip arm brackets and yieldingly engaged with the respective lever means, and a single tripping mechanism mounted on said frame and cooperating with said trip arm brackets in effecting gripping and releasing action of said jaw members in predetermined positions of said shiftable support.

4. A corrugated wire strip transfer device as described in claim 2 including a rotary cam member, a bell crank oscillated by said cam member during its rotation, and a rack bar pivotally coupled with said bell crank and vertically reciprocated thereby, said rack bar being engaged with said gearing and adapted to actuate same.

5. A corrugated wire strip transfer device as described in claim 2 including a rotary cam member, a bell crank oscillated by said cam member during its rotation, a rack bar pivotally coupled with said bell crank and engaged with said gearing for actuating same, and actuating means for said tripping mechanism associated with said cam member for actuating said tripping mechanism in timed relation with respect to said rack bar on said support.

6. A corrugated wire strip transfer device as described in claim 3, wherein the tripping mechanism embodies a pivotally supported main trip lever having a cross pin at one end, a pivotally supported trip finger engaged with the other end of said trip lever to prevent rotation of said lever, and actuating means for disengaging the trip finger from the main trip lever, the cross pin of said main trip lever effecting stopping of upward movement of the trip arm brackets by the table support when these brackets are engaged by the cross pin and therewith spring counteracted opening of the jaw members by continued upward movement of the table, disengagement of said trip lever from said trip finger, permitting snap-like gripping action of the opened jaw member by the spring means actuating upon the scissor like lever means.

7. A corrugated wire strip transfer device as described in claim 6, wherein said pivotally supported trip finger consists of a bell crank lever, one arm of which controls said main trip lever and the other arm of which is coupled with the actuating means.

8. A corrugated wire strip transfer device as described in claim 6, wherein said pivotally supported trip finger consists of a bell crank lever, one arm of which controls said main trip lever and the other arm of which is coupled with said actuating means by weighted means to effect automatic shifting of said first arm into controlling engagement with said main trip lever.

9. A corrugated wire strip transfer device embodying a vertically shiftable table adapted to support a portion of a corrugated wire strip, cooperating pairs of elongated, hook-shaped, wire-strip-gripping members pivoted with their central portions to said table, spring-actuated means yieldingly forcing said wire-strip-gripping members into gripping position, and an actuating device adapted to shift said wire-strip-gripping members against the force of said spring members into releasing positions, said actuating device including shiftable trip arm brackets pivotally connected by said spring-actuated means with the end portions of said wire-strip-gripping means, and a trip lever arrangement including a shiftable member adapted to arrest, in predetermined position by engagement with said brackets, upward movement of the actuating device for shifting the wire-strip-gripping members into released position by an upward movement of the table, and actuating means for the trip lever arrangement adapted to release the shiftable member of said trip lever arrangement to permit shifting of said wire-gripping means to gripping position by the said spring-actuated means.

10. A corrugated wire strip transfer device as described in claim 9 including a single means for shifting said table and operating said actuating means for the trip lever mechanism in a predetermined position of said table.

11. A corrugated wire strip transfer device as described in claim 1, wherein said wire gripping means include gripping members pivotally coupled with said lever means, wherein said lever means have their upper ends pivoted to said gripping members, and their lower ends pivoted to said shiftable supporting means, and wherein said lever means include at their lower ends cam portions cooperating with said spring means in automatically shifting said wire gripping means to gripping position.

SVEND G. BLUMENSAADT.

REFERENCES CITED

The following references are of record in the file of this patent:

UNITED STATES PATENTS

| Number | Name | Date |
| --- | --- | --- |
| 929,375 | Beausejour et al. | July 27, 1909 |
| 1,733,547 | Lorenz | Oct. 29, 1929 |
| 1,882,005 | Emerson | Oct. 11, 1932 |
| 1,904,198 | Brand | Apr. 18, 1933 |
| 2,086,065 | Chorlton | July 6, 1937 |
| 2,277,828 | Morgan | Mar. 31, 1942 |